INVENTOR.
ADOLF VON WANGENHEIM
BY
Andrew K. Foulds
his ATTORNEY

Aug. 2, 1955  A. VON WANGENHEIM  2,714,488
MIXING VALVE
Filed Oct. 15, 1952  3 Sheets-Sheet 3

COLD WATER SUPPLY

HOT WATER SUPPLY

MIXED WATER OUTLET TO TUB OR SHOWER

INVENTOR.
ADOLF VON WANGENHEIM
BY
Andrew K. Fowler
his ATTORNEY

United States Patent Office 2,714,488
Patented Aug. 2, 1955

2,714,488

MIXING VALVE

Adolf Von Wangenheim, Detroit, Mich., assignor to Detroit Controls Corporation, Detroit, Mich., a corporation of Michigan Application October 15, 1952, Serial No. 314,818

4 Claims. (Cl. 236—12)

This invention relates to new and useful improvements in fluid temperature regulating means and more particularly to a combined manual and thermostatic mixing valve which is particularly adapted for controlling flow of water to baths or showers. In the plumbing art, there has long existed a need for a mixing valve for baths and showers which may be adjusted manually and which includes automatic compensation for temperature and pressure changes in the hot and cold water supply lines.

Accordingly, it is one object of this invention to provide a combined manual and thermostatic mixing valve of new and improved construction.

Another object is to provide a manually operated mixing valve of new and improved construction which includes automatic means for compensating for pressure and temperature variations in the supply of hot and cold water therefor.

Another object is to provide a mixing valve having both manually and thermostatically operated mixing valves therein and including a pressure regulating valve operable to compensate for pressure variations in the hot and cold water lines which supply both of said mixing valves.

Another object is to provide a combined thermostatic and manually operated mixing valve of improved construction which is simply and inexpensively manufactured and assembled and which is particularly easy to install and operate.

Other objects will become apparent from time to time throughout the specification and claims as hereinafter related.

This invention comprises the new and improved construction and combination of parts and their operating relation one to another which will be described more fully hereinafter and the novelty of which will be particularly point out and distinctly claimed.

Figures 1, 2:
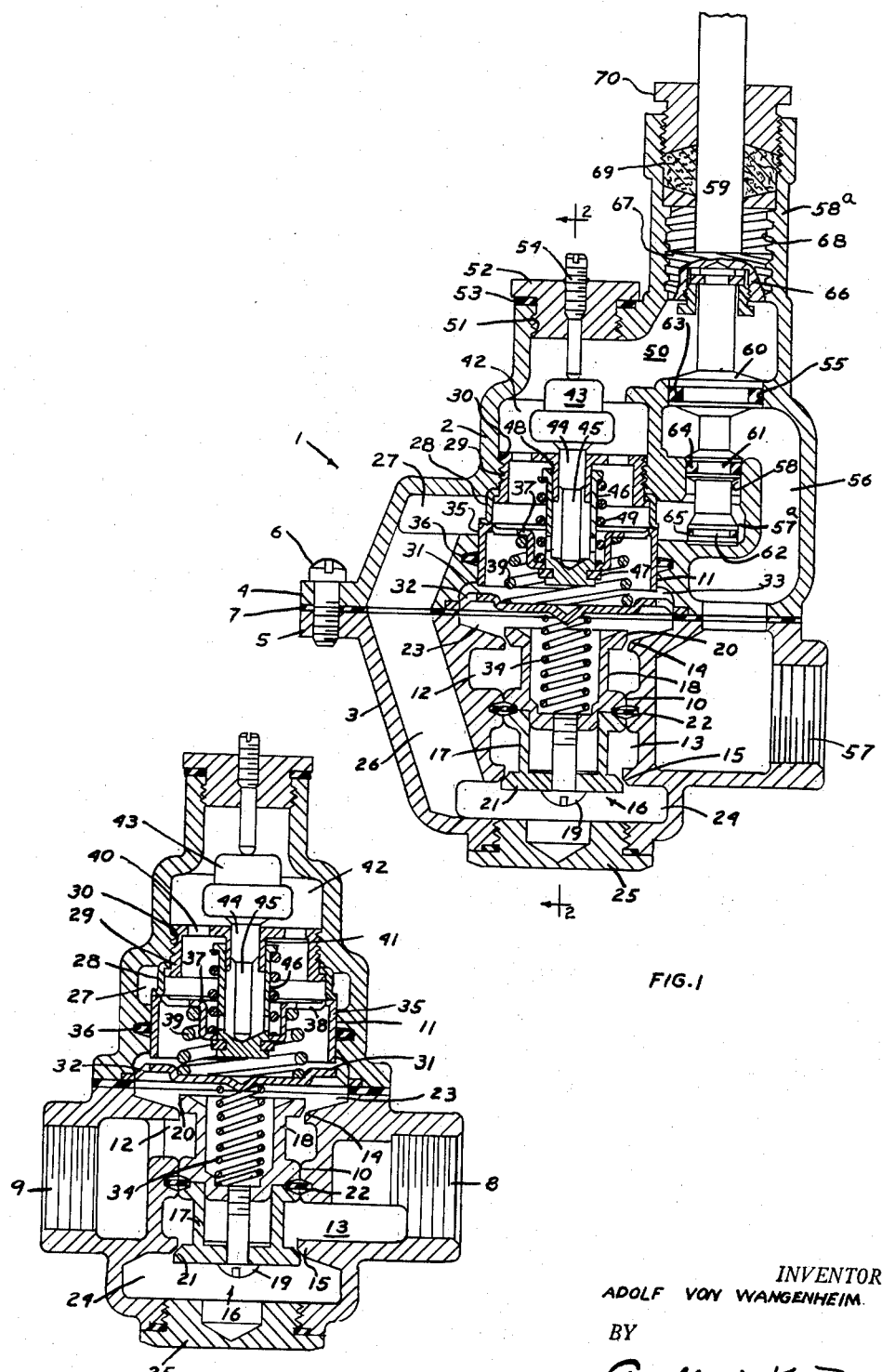
Figure 3:
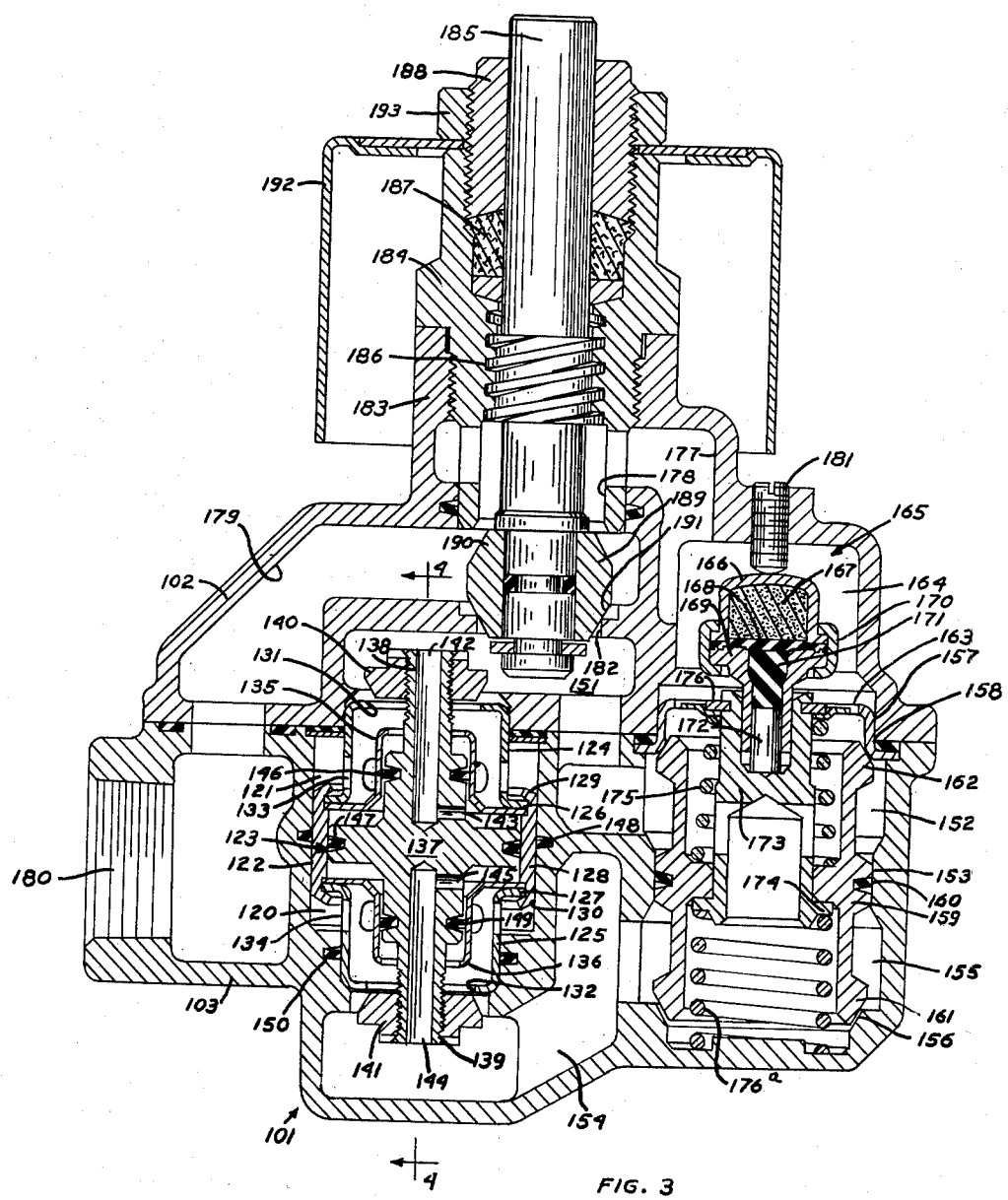
Figure 4:
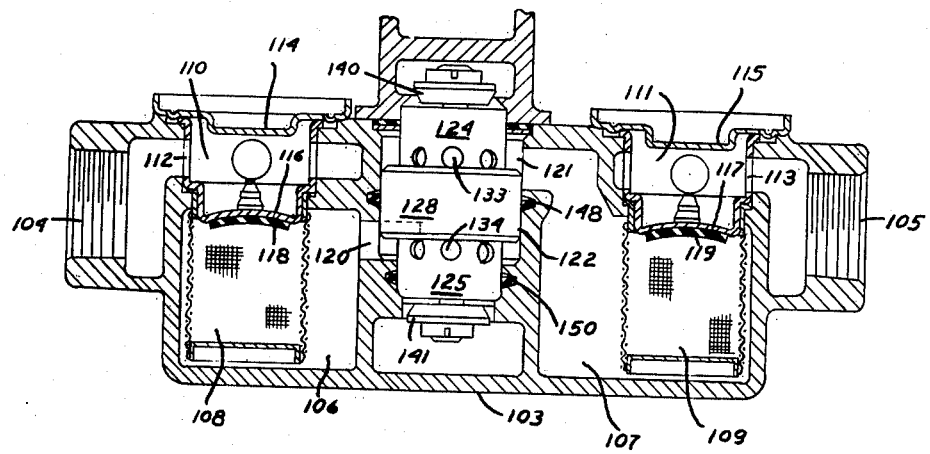
Figure 5:
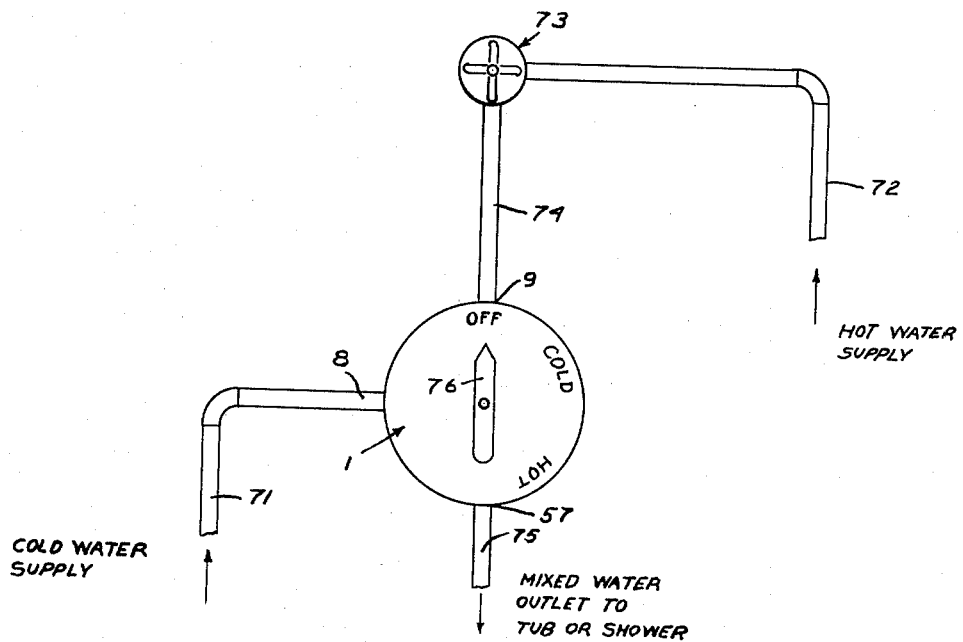

In the accompanying drawings, to be taken as a part of this specification, there are illustrated two preferred embodiments of this invention, in which drawing:

Figure 1 discloses a view in longitudinal central section of one embodiment of this invention, Fig. 2 is a longitudinal sectional view taken on the line 2—2 of Fig. 1, Fig. 3 is a longitudinal central sectional view of another form of mixing valve which embodies part of this invention, Fig. 4 is a fragmentary sectional view taken on the line 4—4 of Fig. 3, and Fig. 5 is a diagrammatic view showing the installation of a mixing valve the types shown in Figs. 1 to 4 in a plumbing system for controlling the supply of water to a bath or a shower.

Referring to the drawings by characters of reference and more particularly to Figs. 1 and 2, there is shown the mixing valve 1 comprising a valve casing which is formed in two casing sections 2 and 3 and peripherally joined at two adjacent flanges 4 and 5 by a plurality of bolts 6. A suitable sealing gasket 7 is interposed between the casing flanges 4 and 5 to prevent leakage therefrom. The valve casing is provided with inlets 8 and 9 for the supply of hot and cold water, respectively, for mixing within the valve casing. Within the valve casing there are provided first and second cylindrical chambers 10 and 11, respectively. The first chamber 10 has annular recessed portions 12 and 13 opening into the inlet passages 9 and 8, respectively. At opposite ends of the chamber 10, there are openings or valve ports through interior walls of the casing which provide valve seats 14 and 15, respectively. Within the chamber 10, there is slidably positioned a piston valve member 16 which is formed in two sections 17 and 18 joined together by a bolt 19. The piston member portions 17 and 18 have enlarged end portions providing valve members 20 and 21 cooperable with the valve seats 14 and 15, respectively. The piston 16 and chamber 10 have adjacent annular recesses therein in which there is positioned an annular sealing member 22 which prevents flow of fluid around the piston. The valve seat 14 and valve member 20 control flow into a recess or passageway portion 23 adjacent the second chamber 11. The valve seat 15 and valve member 21 control flow of fluid into a recess 24 in the lower portion of the valve casing. The recess 24 has an enlarged aperture which is closed by a threaded plug member 25 to permit assembly of the piston valve member 16 in the chamber 10. The recess 24 is connected by a passageway 26 extending longitudinally of the valve casing to an annular recess 27 in the upper casing portion 2 surrounding the upper chamber 11. At the upper end of the second chamber 11, there is positioned an annular valve seat member 28 which is held in position by member 29 which is threadedly secured in an internal aperture 30 opening from the chamber 11. The valve seat member 28 has a predetermined clearance from the wall of the annular recess 27 so that there is provided an annular valve port for flow of fluid into the chamber 11. At the lower end of the chamber 11, there is provided a plate-like valve seat member 31 which has its periphery secured between the upper and lower casing portions 2 and 3 and which divides the chamber 11 from the recess 23. The valve seat member 31 has a plurality of apertures 32 which open from the recess or passageway 23 into a recess 33 surrounding the lower end of the chamber 11. Positioned immediately below the valve seat member 31 there is a spring member 34 which engages the piston valve member 16 and urges the same toward engagement of the valve member 20 with the valve seat 14. Within the chamber 11, there is slidably positioned a cylindrical valve member 35 which is movable between the valve seat members 28 and 31 to proportion the flow of fluid through the passageway 23 and 26, respectively. The chamber 11 is provided with an annular recess intermediate the ends in which there is positioned a sealing washer 36 to prevent flow of fluid around the valve member 35. The valve member 35 has a central dished portion 37 having a plurality of apertures 38 therein for flow of fluid therethrough. The central portion 37 of the valve member 35 receives a spring 39 which is seated at its lower end against the valve seat plate 31 and which urges the valve member 35 toward engagement with the valve seat member 28. The retaining member 29 has a central portion having flow apertures 40 and a sleeve portion 41. The apertures 40 open into a recess 42 in the valve casing in which there is positioned a thermostatic power element 43. The power element 43 is preferably solid expansible power element utilizing the change of state of an organic material such as is described in Patent 2,259,846 to Sergius Vernet. The power element 43 has a guide sleeve portion 44 which is supported in the sleeve portion 41 of the supporting member 29. The power element 43 also has an operating piston 45 which is guided in the sleeve 44 and operated by the expansion of the thermostatic material within the power element casing. The operating piston 45 abuts the lower end of the hollow motion transmitting piston member 46 which is slidably guided on the sleeve 41. The piston 46 extends through an aperture in the central portion 37 of the valve member 35 and has a collar 47 which abuts the lower side thereof. The piston 46 also has a flange 48 at its upper end which receives a spring 49. The spring 49 holds the valve member 35 in operating engagement with the piston 46 through the engagement with the collar 47 thereon. The recess 42, in which the power element 43 is positioned, opens into a passageway 50 extending laterally of the casing. The upper casing portion 2 has a threaded aperture 51 which opens into the passageway 50 and which is closed by a threaded plug member 52 and sealed by a suitable gasket or washer member 53. The plug member 52 has a threadedly adjustable rod 54 extending therethrough into engagement with the power element 43 and is adjustable to vary the position of said power element. The passageway 50 opens through a valve port 55 into the passageway 56 which extends to the outlet 57 from the lower valve casing 3. The annular recess 27 around the upper end of the chamber 11 provides a by-pass passageway 57ª which opens through the valve port 58 into the passageway 56. The valve ports 58 and 55 are aligned with each other and with a hollow threaded tubular extension 58ª on the upper valve casing portion 2. A valve stem 59 extends through the tubular extension 58ª and through the valve ports 55 and 58 and is provided with spaced valve member portions 60, 61, and 62 having peripheral sealing O rings 63, 64, and 65, respectively. The valve stem 59 is formed in two sections which are connected together by a loose fitting collar joint 66 which permits rotation of the upper portion of the stem relative to the lower portion. The valve stem 59 has an enlarged threaded portion 67 which cooperates with the threads 68 in the tubular extension 58ª for movement of the valve members. The valve is protected against leakage around the valve stem 59 by suitable packing 69 which is held in position by a packing nut 70.

*Operation*

In operation, this valve is connected in the manner shown in Fig. 5. A cold water supply line 71 is connected to the cold water inlet 8 to this mixing valve. A hot water supply line 72 is connected to the inlet side of a volume regulating valve 73 which is operable to control the flow of hot water to the valve. The valve 73 is connected by suitable pipe or conduit 74 to the hot water inlet 9 of the mixing valve 1. The outlet 57 from this valve is connected by a suitable pipe or conduit 75 to the tub or shower to which the water is to be supplied. The valve 1 has a handle 76 which is carried on and operates the valve stem 59 for operation of the valve members 60, 61, and 62. The hot and cold water which enters the inlets 8 and 9, respectively, passes into the recesses 13 and 12 in the chamber 10. The pressure of water in the hot and cold supply lines operates on the piston 16 to position the same according to the difference in pressure between said supply lines. This difference in pressure will move the valve members 20 and 21 relative to the valve seats 14 and 15. The movement of the piston valve 16 is operable to control the hot and cold water supply to maintain the relative flow in the hot and cold lines substantially equal in case of pressure variations. The hot water passes the valve member 20 and enters the recess 33 through the apertures 32 in the valve seat member 31. The cold water passes the valve member 21 and is conducted through the passageway 26 to the recess 27 which surrounds the upper end of the mixing valve chamber 11. The hot and cold streams of water flow past at opposite ends of the valve member 35 into the mixing valve chamber 11 and are mixed to provide a supply of tempered water as determined by the power element 43. The mixed water from the mixing chamber 11 flows out through the apertures 40 past the power element 43 in the recess 42. The power element 43 is operable to maintain a substantially constant mixed water temperature by varying the position of the valve member 35 relative to the valve seat members 28 and 31 to proportion the hot and cold water, respectively, to produce the desired mixed water temperature. The mixed water temperature which is determined by the thermostat 43 is the maximum hot water temperature desired for the particular shower or bath installation. The arrangement of the valve 60, 61, and 62 permits the variation of temperature of water delivered to the bath or shower from the maximum value determined by the thermostat 43 down to the temperature of the cold water stream. The mixed water flowing from the recess 42 passes through the passageway 50, valve port 55, and passageway 56 to the outlet 57 from the valve casing. The cold water supply is provided with a by-pass passageway 57ª and control valve port 58 therefor. The spacing of the valve members 60, 61, and 62 on the valve stem 59 is such that a small predetermined movement of the valve stem 59 will cause the valve member 61 to open the valve port 58 for flow of cold water to the valve casing outlet 57. An additional movement of the valve stem 59 will increase the flow of cold water to the maximum flow of cold water permitted through this valve. Further movement of the valve stem 59 will cause the valve member 60 to open the valve port 55 for mixing the stream of tempered water flowing from the mixing valve chamber 11 with the cold water stream flowing through the by-pass valve port 58. Further movement of the valve stem 59 will move the valve member 60 to increase the flow of tempered hot water and decrease the flow of cold water through the valve port 58 by movement of the valve member 62 toward a closed position. Still further movement of the valve stem 59 will move the valve member 62 to close off completely the flow of cold water through the valve port 58 and will result in a maximum flow of tempered water through the valve port 55. From the description of operation of the valve members 60, 61, and 62, it will be seen that this valve permits one to turn on first the cold water supply and upon further operation of the valve stem 59, to increase the supply of cold water and then to supply increasing amounts of tempered water up to a point to which the water supply discharging from the casing outlet 57 is entirely tempered water flowing from the mixing valve chamber 11. In practice, the thermostat 43 would probably be set to maintain a tempered water temperature of about 110 to 115° and the movement of the valve stem 59 would be capable of varying the temperature of water supplied through this valve from 110 to 115° down to the cold water temperature. The rotatable connection 66, which permits rotary movement between the upper and lower portions of the valve stem 59, is provided so that the lower portion of the valve stem 59 will not rotate with the upper portion thereof and will undergo only a linear movement, thus reducing the frictional wear on the O rings 63, 64, and 65. The arrangement in this valve, which provides a pressure differential piston valve 16 controlling the flow of hot and cold water to the thermostatic mixing valve 35, is operable to prevent variations in operation by the thermostatic portion of the valve due to sudden abrupt changes in pressure in either the hot or cold supply lines. The pressure equalizing valve 16 also controls the flow of cold water through the by-pass passageway 57ª and valve port 58 to protect the manual setting of the valve against variations due to pressure changes. If there is a sudden pressure change in either the hot or cold water line, the pressure equalizing valve 16 will compensate for said pressure changes by adjusting automatically the flow of water to the thermostatic mixing valve and to the manually operated valve 61 which controls the mixing of cold water with tempered water for manual setting of water temperature. The valve is provided with the spring and piston transmission arrangement 49, 46 to permit overtravel by the power element piston 45 in the event of excessive temperature around the power element. The spring 34 which engages the pressure equalizing valve 16 is operable to insure complete closure of the hot water control side of the pressure equalizing valve in the event there is a failure in the cold water supply line.

In spite of the pressure equalizing valve arrangement provided in this valve, it has been found that with very high pressure differences between the hot and cold water supply lines, there will still occur a variation in the temperature setting of the valve due to the variation in flow caused by such unequal pressures. In this connection, it was found that with the arrangement shown in Fig. 5 and with hot and cold water line pressures at 130 p. s. i. each and hot and cold water temperatures at 152° and 59°, respectively, the valve would maintain a mixed water temperature of 106° at a flow of 2.5 gallons per minute. In this same installation, when the hot water pressure was decreased to 40 p. s. i., the mixed water temperature dropped to 105°. Similarly, when the hot water pressure was held at 130 p. s. i. and the cold water temperature dropped to 40 p. s. i., the mixed water temperature increased to 108°. When this same valve, however, was connected with the volume regulating valve 73 controlling flow through the outlet pipe 75, there occurred an unexplained and totally unexpected variation in the operation of the valve. In such an installation, it was found that with the cold water pressure maintained at 130 p. s. i. and the hot water pressure decreased to 40 p. s. i., the mixed water temperature decreased to 100°. Similarly, when the hot water pressure was maintained at 130 p. s. i. and the cold water pressure decreased to 40 p. s. i., the mixed water temperature increased to 120°. It thus seems that when the volume regulating valve 73 is positioned to control flow of water on the inlet side of the mixing valve, the valve is capable of maintaining substantially constant temperatures in spite of pressure variations in the hot and cold water supply lines. On the other hand, when the volume regulating valve 73 is positioned to control flow on the outlet from the mixing valve, the variations due to pressure changes are in the region of 20°. The explanation for the variation in the operation of this valve when connected in the different arrangements just described is not fully known and no means has as yet been discovered to correct this variation in operation when the volume regulating valve is placed on the outlet side of the valve.

Referring to the valve disclosed in Figs. 3 and 4, there is provided a slight modification in the construction disclosed in Figs. 1 and 2. In these figures, there is shown a valve 101 comprising an upper valve casing portion 102 and a lower valve casing portion 103. The valve casing is provided with inlets 104 and 105 for hot and cold water, respectively. The valve casing is provided with inlet recesses 106 and 107 in which are positioned strainers 108 and 109. In the recesses 106 and 107, there are also positioned cup-shaped casing members 110 and 111 having flow apertures 112 and 113 therein. The members 110 and 111 are closed at their upper ends by cover member portions 114 and 115 and have apertured lower end walls 116 and 117, respectively. The lower end walls 116 and 117 carry flapper type rubber check valve members 118 and 119, respectively, such as are described in my co-pending application, Serial No. 169,196, now Patent No. 2,688,978, entitled Liquid Flow Check Valve. The inlet recesses 106 and 107 open into annular cavities 120 and 121 in a pressure equalizing valve chamber 122. In the chamber 122, there is positioned a pressure equalizing valve cage assembly 123. The valve cage assembly 123 has upper and lower cup-shaped casing portions 124 and 125 which have flanged portions 126 and 127 secured to an annular securing member 128 by upper and lower inturned flanges 129 and 130 thereon. The upper casing member 124 has a valve port 131 therein and the lower casing member 125 is provided with a similar valve port 132. The upper and lower casing members 124 and 125 are provided with side apertures 133 and 134, respectively, for flow from the annular recesses 120 and 121 to the valve ports 132 and 131. The pressure equalizing valve is provided with inner casing portions 135 and 136, respectively. Within the inner casing and extending through the apertured open ends thereof, there is provided a movable piston valve member 137 having hollow extensions 138 and 139 carrying valve members 140 and 141 cooperable with the valve ports 131 and 132, respectively. The valve member extensions 138 and 139 are provided with longitudinal and lateral passages 142, 143 and 144, 145. The piston valve member and valve cage construction is provided with a plurality of washer-shaped annular sealing diaphragms 146, 147, 148, 149, and 150. The valve port 131 is connected by passageway 151 to the annular inlet portion 152 of a mixing valve chamber 153. The valve port 132 is similarly connected by passageway 154 to an annular inlet portion 155 in the mixing valve chamber 153. The mixing valve chamber 153 has a valve seat 156 at its lower end and has a cup-shaped supporting member 157 providing a valve seat 158 at its upper end. There is a hollow valve member 159 which is slidably positioned in the mixing valve chamber 153 and secured against leakage by an annular sealing diaphragm 160. The valve member 159 has valve surfaces 161 and 162 cooperable with the valve seats 156 and 158, respectively. The mixing valve chamber 153 opens through one or more apertures 163 in the supporting member 157 into a recess 164 in which there is positioned the power element 165. The power element 165 is substantially identical with power element 43 shown in Figs. 1 and 2 but is shown in a sectional view to provide more of its details of operation. The power element 165 comprises a cup-shaped casing 166 enclosing a thermostatic material 167. The thermostatic material 167 is preferably an organic material which has a high rate of expansion upon passing through a change of state. The power element casing 166 is closed by a diaphragm 168 and a guide sleeve member 169 which are held in position by an annular securing ring 170. The diaphragm 168 transmits movement to a thrust transmitting plug 171 which is operable to move a piston 172 slidably positioned in the sleeve member 169. The piston member 172 engages a hollow motion transmitting piston 173 which has a lower flange 174 held in engagement with the valve member 159 by a spring 175. The spring 175 engages a collar member 176 carried on the upper end of the piston 173. The piston 173 is engaged at its lower end by a spring 176ª which urges the valve member 159 toward engagement of the valve surface 162 with the valve seat 158. The casing recess 164 is connected by a passageway 177 and a valve port 178 to the passageway 179 leading to a mixed fluid outlet 180. The power element 165 is held adjustably in position by an adjustment screw 181. There is also provided a valve port 182 opening from the cold water passageway into the passageway 179 leading to the mixed water outlet 180. The valve ports 178 and 182 are aligned with each other and with a tubular extension 183 on the upper valve casing 102. In the tubular extension 183, there is threadedly supported a tubular guide member 184 in which there is positioned a valve stem 185. The valve stem 185 extends through the guide member 184, tubular extension 183, and valve ports 178 and 182. The valve stem 185 is threaded as at 186 for adjustable movement and is provided with packing 187 at its upper end to prevent leakage therearound. The packing 187 is held in position by a packing nut 188. At the lower end of the valve stem 185, there is positioned a valve member 189 having upper and lower valve surfaces 190 and 191 cooperable with the valve ports 178 and 182, respectively. At the upper end of the guide sleeve member 184, there is carried a cup-shaped member 192 which is secured in position by a nut 193. The member 192 is operable to provide indicia to register with the pointer on a handle for the valve stem 185 which is not shown. The valve stem 185 and guide member 186 and parts carried thereon are removable from the valve casing as a unit.

*Operation*

In operation, the mixing valve just described functions similarly to the one shown and described in Figs. 1 and 2. In this valve, cold water enters through the inlet 105 and hot water through the inlet 104. The inlet recesses 106 and 107 are provided with check valves 118 and 119 which prevent back flow from one supply line to the other in the event of an abnormal pressure difference between said lines. The cold water from the inlet 105 enters the pressure equalizing valve chamber through the annular recess 121 and passes out through the valve port 131 which is controlled by the valve member 140. The hot water from the inlet 104 enters the pressure equalizing valve chamber through the annular passage 120 and passes out through the valve port 132 which is controlled by the valve member 141. The pressure in the hot and cold water lines is communicated to opposite sides of the piston 137 through the passage 142, 143 and 144, 145, respectively. The piston 137 modulates its position in accord with the difference of pressure between the hot and cold water lines and adjusts the position of the valves 140 and 141 to maintain substantially equal flow in the hot and cold lines. The hot water passes from the pressure equalizing valve through the passageway 154 and annular recess 155 to the mixing valve chamber 153. The cold water similarly passes from the pressure equalizing valve through the passageway 151 and the annular recess 152 to the mixing valve chamber 153. The thermostatic power element 167 is operable to move the valve member 159 to control the relative flow of hot and cold water into the mixing valve chamber in accordance with the temperature of mixed water flowing past the power element. The mixed water or tempered water flowing past the power element 165 passes through the passageway 177, valve port 178, passageway 179, and is discharged through the outlet 180. The valve member 189 controls the flow of cold water through the by-pass valve port 182 for mixing with the tempered water flowing from the mixing valve chamber. In this valve arrangement, the manually operated valve 189 is operable to proportion the relative flow of cold water and tempered water but is not arranged to shut off completely both passages as in the valve shown in Figs. 1 and 2. In this valve, however, as well as the one shown and described in Figs. 1 and 2, the pressure equalizing valve controls the flow of hot and cold water to the mixing valve and also controls the flow of cold water to the manually operated mixing valve 189.

Although there have been described only two embodiments of this invention, it will be obvious to those skilled in the art that other embodiments are possible without departing from the scope of coverage of this invention which is defined by the appended claims.

Having thus described the invention, what is claimed and is desired to be secured by Letters Patent of the United States is:

1. In a fluid temperature regulating means, a valve casing having hot and cold fluid inlets and a mixed fluid outlet, said casing having first and second chambers therein, first and second passageways extending from said inlets to said first chamber, said first chamber having outlet openings at opposite ends forming valve ports, a piston member movably positioned in said first chamber, a sealing diaphragm surrounding said piston member within said first chamber at a point between said first and second passageways so that said piston member will move in accord with the pressure differential between said passageways, a pair of valve members carried on opposite ends of said piston member and cooperable with said valve ports, said valve members being positioned relative to said valve ports according to said fluid pressure differential, third and fourth passageways extending from said valve ports to conduct hot and cold fluid, respectively, to opposite ends of said second chamber, valve seats in said second chamber providing valve ports for controlling flow of fluid, a valve member movable between said last-named valve seats to determine the proportion of fluid flowing through said third and fourth passageways, a passageway extending from said second chamber to said outlet, a thermostatic power element positoned in said last-named passageway and connected to said last-named valve member to determine the position thereof in accord with mixed fluid outlet temperature, a by-pass passageway opening from said fourth passageway into said outlet passageway, said outlet and by-pass passageways having portions defining aligned valve ports, a valve member movable between said last-named valve ports and having valve faces cooperable with the same and operable to open one and close the other of said ports upon movement in one direction, and a manually operated stem connected to said last-named valve members for conjoint operation thereof.

2. In a fluid temperature regulating means, a valve casing having hot and cold fluid inlets and a mixed fluid outlet, said casing having first and second chambers therein, first and second passageways extending from said inlets to said first chamber, said first chamber having outlet openings at opposite ends forming valve ports, a piston member movably positioned in said first chamber, a sealing diaphragm surrounding said piston member within said first chamber at a point between said first and second passageways, said piston member being moved in response to the pressure differential between fluid flowing in said passageways, a pair of valve members carried on opposite ends of said piston member and cooperable with said ports to control flow therethrough in accord with said pressure differential, third and fourth passageways extending from said valve ports to conduct hot and cold fluid, respectively, to opposite ends of said second chamber, valve seats in said second chamber providing valve ports for controlling the relative flow of hot and cold fluid, a hollow valve member slidably movable in said second chamber and cooperable at opposite ends with said valve seats, a passageway extending from said second chamber to said outlet and having a portion forming a valve port, a thermostatic power element positioned in said last-named passageway and operatively connected to said last-named valve member to determine the position thereof in accord with mixed fluid temperature, a by-pass passageway opening from said fourth passageway into said outlet passageway and having a portion forming a valve port aligned with said last-named valve port, a manually operated valve stem extending from exterior of said casing and through said outlet and by-pass valve ports, first, second, and third valve members on said valve stem, said first and second valve members having an initial position closing said outlet and by-pass valve ports, respectively, said third valve member having an initially open position relative to said by-pass valve port, and said valve members being spaced on said valve stem so that a small predetermined movement will cause said second valve member to open said by-pass valve port, further movement will cause said first valve member to open said outlet valve port, and still further movement will cause said third valve member to close said by-pass valve port.

3. In a fluid temperature regulating means, a valve casing having hot and cold fluid inlets and a mixed fluid outlet, said casing having first and second chambers therein, first and second passageways extending from said inlets to said first chamber, said first chamber having outlet openings at opposite ends forming valve ports, a piston member movably positioned in said first chamber, a sealing diaphragm surrounding said piston member within said first chamber at a point between said first and second passageways, said piston member being moved in response to the pressure differential between fluid flowing in said passageways, a pair of valve members carried on opposite ends of said piston member and cooperable with said ports to control flow therethrough in accord with said pressure differential, third and fourth passageways extending from said valve ports to conduct hot and cold fluid, respectively, to opposite ends of said second chamber, valve seats in said second chamber providing valve ports for controlling the relative flow of hot and cold fluid, a hollow valve member slidably movable in said second chamber and cooperable at opposite ends with said valve seats, a passageway extending from said second chamber to said outlet and having a portion forming a valve port, a thermostatic power element positioned in said last-named passageway and operatively connected to said last-named valve member to determine the position thereof in accord with mixed fluid temperature, a by-pass passageway opening from said fourth passageway into said outlet passageway and having a portion forming a valve port aligned with said last-named valve port, a manually operated valve stem extending from exterior of said casing and through said outlet and bypass valve ports, first, second, and third valve members on said valve stem, said first and second valve members having an initial position closing said outlet and by-pass valve ports, respectively, said third valve member having an initially open position relative to said by-pass valve port, and said valve members being spaced on said valve stem so that a small predetermined movement will cause said second valve member to open said by-pass valve port, further movement will cause said first valve member to open said outlet valve port, and still further movement will cause said third valve member to close said by-pass valve port, and a manually operated flow regulating valve positioned to control the volume of fluid flowing into said hot fluid inlet.

4. A temperature controlling valve comprising a casing having a lower portion and an upper portion, said lower portion having a hot liquid inlet and a cold liquid inlet, flow equalizing valve means controlling flow through said inlets, means responsive to pressure of the liquid entering said inlets and operable to actuate said equalizing valve means, means forming an annular valve seat, first and second conduits leading from said equalizing valve means, said first conduit conveying hot liquid to said valve seat, a second valve seat spaced from and concentric with said first valve seat, said second conduit conveying cold liquid from said equalizing valve to said second valve seat, a tubular valve member having its opposite end portions engageable alternately with said seats, means to guide said tubular valve member, a pair of spring means within said tubular valve member and acting in opposition to each other, thermostatic means responsive to the temperature of the liquid flowing through said valve seats and operable to move said tubular valve member to reduce flow through said first-named valve seat upon temperature increase, one of said spring means opposing such movement of said tubular valve member, the other of said spring means acting with said thermostatic means to urge said tubular valve member toward said first-named valve seat, abutment means within said upper casing portion and positioning said thermostatic means, means to adjust said abutment means to determine the temperature at which said tubular valve member will engage said first-named valve seat, a conduit in by-pass relation to said tubular valve member and leading from said second conduit for conveying cold liquid, said casing having an outlet, and valve means controlling flow of mixed hot and cold liquid and of cold liquid from said by-pass conduit to said outlet.

References Cited in the file of this patent

UNITED STATES PATENTS

| | | |
|---|---|---|
| 1,545,938 | Bren | July 14, 1925 |
| 2,284,424 | Hein | May 26, 1942 |
| 2,483,312 | Clay | Sept. 27, 1949 |
| 2,484,180 | McConnell | Oct. 11, 1949 |
| 2,526,099 | Vinson | Oct. 17, 1950 |
| 2,620,133 | Obermaier | Dec. 2, 1952 |